United States Patent [19]

Kehl et al.

[11] Patent Number: 4,890,538

[45] Date of Patent: Jan. 2, 1990

[54] BRAKE CYLINDER

[75] Inventors: Georg Kehl; Heinz Siegel, both of Stuttgart, Fed. Rep. of Germany

[73] Assignee: Robert Bosch GmbH, Stuttgart, Fed. Rep. of Germany

[21] Appl. No.: 213,045

[22] Filed: Jun. 29, 1988

[30] Foreign Application Priority Data

Aug. 29, 1987 [DE] Fed. Rep. of Germany ....... 3728921

[51] Int. Cl.⁴ ................................................ F15B 9/10
[52] U.S. Cl. .................................. 91/376 R; 60/547.1
[58] Field of Search ...................... 91/374, 376 R, 370, 91/372; 60/547.1

[56] References Cited

U.S. PATENT DOCUMENTS

| | | | |
|---|---|---|---|
| 2,318,756 | 5/1943 | Chouings | 91/376 R X |
| 2,407,097 | 9/1946 | Porter | 91/376 R X |
| 2,698,205 | 12/1954 | Gagen | |
| 2,879,747 | 3/1959 | Stelzer et al. | 91/376 R X |
| 3,707,112 | 12/1972 | Ewald | 91/376 R |
| 3,712,177 | 1/1973 | Bach et al. | 91/376 R X |
| 3,733,966 | 5/1973 | Brown, Jr. | 91/372 |
| 3,747,473 | 7/1973 | Bach et al. | 91/376 R X |
| 4,075,848 | 2/1978 | Ueda | 91/370 X |
| 4,135,435 | 1/1979 | Adachi | 91/372 X |

OTHER PUBLICATIONS

S.A.E. Paper 840465, pp. 42, 43, 44.

Primary Examiner—Robert E. Garrett
Assistant Examiner—Mark A. Williamson
Attorney, Agent, or Firm—Edwin E. Greigg

[57] ABSTRACT

The invention relates to a brake cylinder suitable for a hydraulic vehicle brake system, having at least one brake chamber and a brake booster, actuatable by a piston rod, with a brake valve assembly that has an inlet and an outlet for power brake fluid and communicates with a pressure chamber of the brake booster. The pressure chamber is located in a longitudinally bored housing section and is defined in the axial direction by one end of a sealed and displaceable sheath and of a rod that is sealed and displaceable within the sheath. The sheath and rod form two servo pistons for generating brake pressure in the brake chamber. The rod is displaceable in an emergency by means of the coaxially aligned piston rod. In a space-saving manner, the brake valve assembly is built into the rod and piston rod.

20 Claims, 1 Drawing Sheet

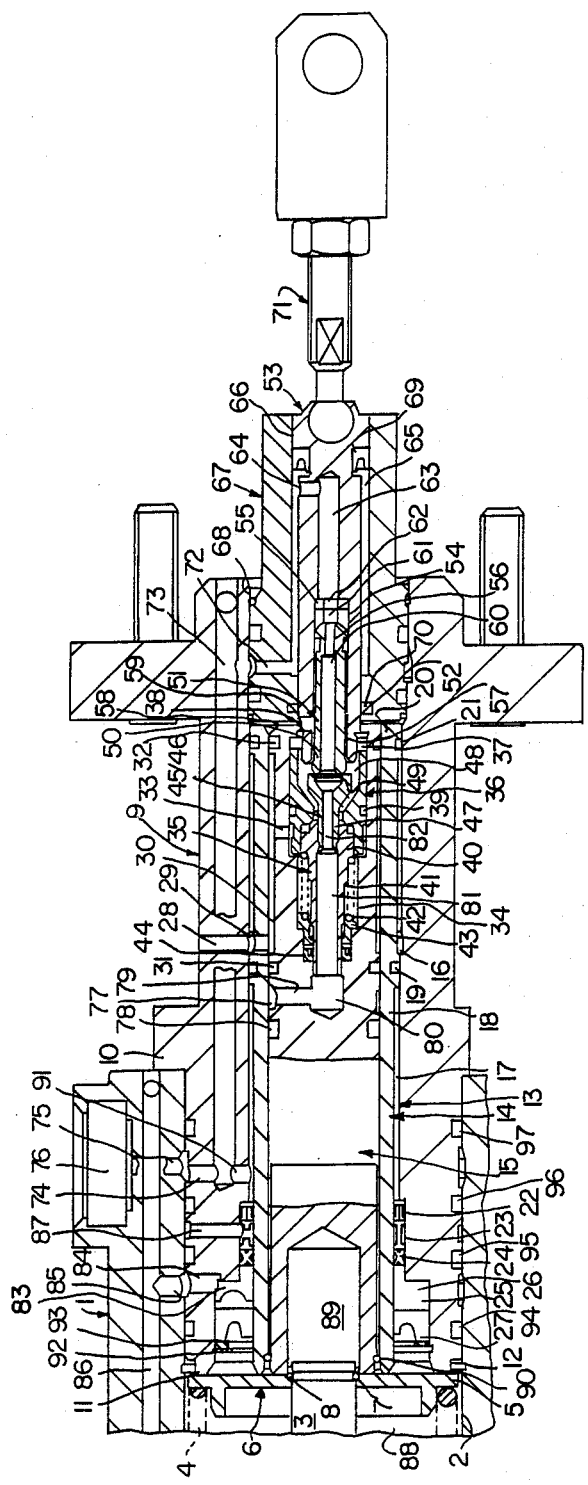

BRAKE CYLINDER

BACKGROUND OF THE INVENTION

The invention relates to a brake cylinder having at least one brake chamber and a brake booster, actuatable by a piston rod, as generically defined hereinafter.

In brake cylinders now being installed in motor vehicles, brake boosters are typically provided between the brake pedal to be actuated and the corresponding brake chambers; after the brake pedal is actuated, these brake boosters generate a brake pressure independently of a brake force brought to bear. To this end, after brief actuation of the brake pedal, a pressure chamber connection to a reservoir or supply container is opened, and brake fluid is pumped out of the reservoir or supply container into the pressure chamber, for instance via a pump. The expanding pressure chamber puts a servo piston or the like under pressure, which transmits this pressure for instance to a piston in a brake chamber and thus reinforces the brake pressure.

Once the brake pressure has receded, a return line for the brake fluid present in the pressure chamber must be provided, so as to be able to relieve the servo piston or the like. A substantial factor in such brake boosters is the interplay between the opening or closing of the flow of brake fluid to the pressure chamber and the control of its return. Because of the many operative seals in such a structure the risk of leakage is very high. As a result, the servo pump must often pump power brake fluid out of the supply container to the reservoir, which requires energy and moreover cannot be done noiselessly.

OBJECT AND SUMMARY OF THE INVENTION

A brake cylinder having a least one brake chamber and a brake booster actuatable by a piston rod, in which a pressure chamber communicates via a brake valve assembly with both an inlet and an outlet for power brake fluid, contrarily, has an arrangement of seals, and in particular an embodiment of the assembly that replaces the servo piston, that largely prevent leakage.

The entire brake valve assembly is disposed in a stepped bore of a rod surrounded by a sheath, which together can be considered a replacement for the known servo piston. The brake cylinder is designed such that on the one hand, the sheath slides in a suitable housing section, and on the other, the rod slides in the sheath.

On the one hand, in a brake chamber, the sheath and rod meet an element by way of which brake fluid can be pumped to the proper brake circuit of the brake system. In the present exemplary embodiment, this element is a disk. However, it may also be a piston or the like. This disk is spring-supported, so that when the brake pressure recedes, the rod and sheath are returned to their outset position.

On the other hand, the sheath and rod together with the insert body form a pressure chamber for the power brake fluid; the insert body is stationary, so that when the pressure chamber is filled, the sheath and rod move away from the insert body.

The insert body is also penetrated by the known piston rod, which can be put under pressure via a suitable brake pedal. The control of the brake valve assembly takes place via this piston rod, which also engages the stepped bore in the rod.

It is important that the rod is sealed off from the sheath, and the sheath from the housing section, with low-friction seals, so that the sliding of the two elements is hindered as little as possible. Each two of these low-friction seals enclose between them an annular inlet chamber as well as an annular chamber into which the power brake fluid is delivered from the reservoir. Especially when the brake valve is closed, this servo brake fluid is at a certain pressure in the annular chambers, so that leakage is possible via the low-friction seals. On the one hand, these leaks would flow into the pressure chamber, which in the position of repose communicates via the brake valve assembly with the return line to the supply container. On the other hand, particular provisions have been made to divert such leaks. Between the sheath and the housing section, the applicable low-friction seal is followed by a further annular chamber, which communicates with the return line via a bore. Leaks are thereby drained directly into the return line.

On the other hand, a separate annular chamber is formed between the sheath and the rod, and it communicates with the return line via a transverse bore or other bores in elements of the brake valve assembly.

Another very important feature is that the brake chamber region and the brake booster region are sealed off from one another. To this end, a suitable sealing ring is provided between the aforementioned annular chamber, for draining the power brake fluid originating from leakage, and the brake chamber. The sealing action of this sealing ring is still further reinforced by the provision that the rod is guided in the sheath resting relatively closely against it.

The annular chamber which follows the low-friction seal between the housing section and the sheath and from which leakage fluid is fed directly into the power brake fluid return line is sealed off on the other side of this low-friction seal by a further low-friction seal. According to the invention, a collecting chamber is provided between this low-friction seal and the brake chamber, communicating via suitable bores with the power brake fluid return line leading to the brake fluid supply container.

However, in order to assure that as little power brake fluid as possible reaches the collecting chamber, this chamber is sealed off from the brake chamber by a lip seal. Yet to provided further partitioning off of the collecting chamber from the servo brake fluid region, a further low-friction seal is also provided. Between these two low-friction seals, there should be a support ring; the chamber receiving this ring discharges from the brake cylinder via a bore.

By means of this arrangement of seals, leakage between the brake chamber and the brake booster is largely avoided; yet should it occur, the leaks are drained away. As a result, the brake valve assembly in particular can be kept very tight, making frequent refilling of the reservoir unnecessary. This both saves and avoids producing additional noise. The overall apparatus is structurally very compact.

Another essential factor in the invention is the interplay between the rod and the sheath. When power brake fluid flows into the pressure chamber behind the rod and the sheath, these two elements are both displaced in common toward the brake chamber. If the brake booster should fail, for whatever reason, then the rod is displaced toward the brake chamber via the piston rod, independently of the sheath. In that case, the sheath remains in its non-braking position. This independence is assured by a thrust collar, which is arranged such that it comes into engagement with the sheath only upon the return of the rod.

The brake valve assembly has already been set forth in U.S. patent application Ser. No. 189,893 filed May 3, 1988. It has two seat valves, one of them embodied by a valve cone and a valve bushing. A valve tappet is inserted into the valve cone and in turn, with a bushing inserted into the piston rod, embodies the second seat valve for the outlet of the power brake fluid. This assures that one valve closes when the other one opens.

The return of the power brake fluid is accomplished in the present exemplary embodiment via axial bores in the bushing and piston rod as well as suitable annular chambers and bores. This axial bore in the bushing also communicates with the aforementioned axial bores leading to the annular chamber between the low-friction seal and the seal toward the brake chamber.

The invention will be better understood and further objects and advantages thereof will become more apparent from the ensuing detailed description of a preferred embodiment taken in conjunction with the drawing.

BRIEF DESCRIPTION OF THE DRAWING

The single drawing FIGURE is a longitudinal cross section taken through a master brake cylinder shown only in part, in particular in the vicinity of a brake booster.

DESCRIPTION OF THE PREFERRED EMBODIMENT

A housing 1 has an interior 2, in which at least one brake chamber for at least one brake circuit of a brake system is provided. The transmission of the brake pressure is effected, among other ways, via a rod 3 upon a piston, not shown in further detail. A compression spring 4 is also supported on the first piston and meets a flange-like extension 5 of a disk 6, which surrounds the rod 3. The disk 6 is coupled to the rod 3 with a snap ring 7, so that although the disk 6 can slide along the rod 3 toward the piston, the rod 3 can nevertheless not be removed from the central hole 8 in the disk 6.

Located in the interior 2 is a housing section 9 supported via an annular flange 10 against the housing 1. In the position of repose, the disk 6 rests with its flangelike extension 5 on an annular face 11 of the housing section 9; in this vicinity, a locking ring 12 that limits the range of motion of the disk 6 is inserted into the wall of the interior 2.

A sheath 14 that surrounds a rod 15 is seated in an axial stepped bore 13 in the housing section 9. Toward the housing section 9, the sheath 14 forms an annular inlet chamber 16 and an annular chamber 17; a low-friction seal 19 is seated in a sliding flange 18 between the annular inlet chamber 16 and the annular chamber 17. A further sliding flange 20 having a low-friction seal 21 closes off the annular inlet chamber 16. On the other side of the seal 19, the annular chamber 17 is likewise defined by a low-friction seal 22, which is followed by a support ring 23, a further low-friction seal 24, a support body 25 supported on the housing shoulder 26, and a lip seal 27.

The annular inlet chamber 16 is in alignment with an inlet bore 28 for power brake fluid; in a manner not shown, this inlet bore 28 communicates via a suitable line with a reservoir or pump for power brake fluid from a supply container. From the annular inlet chamber 16, a radial bore 29 leads to a further annular chamber 30, which is formed between the rod 15 and sheath 14. This annular chamber 30 is likewise defined on both sides by low-friction seals 31 and 32.

From the annular chamber 30, a further bore 33 leads to the actual brake valve of the brake booster, which is received in a stepped bore 34 of the rod 15. The innermost part of this brake valve is embodied by a valve cone 35, which is retained in the stepped bore 34 by a valve bushing 36, which following a ring 37 is supported against a snap ring 38. Toward the stepped bore 34, the valve bushing 36 is lined with an O-ring seal 39.

The valve cone 35 also has a collar 40, which is engaged by a compression spring 41, which on its other end is supported on a support body 42 which surrounds the valve cone 35. This support body 42 in turn presses against a shoulder 43 provided in the stepped bore 34 and secures a lip seal 44 in the axial direction.

Toward the valve cone 35, the valve bushing 36 forms a bowl-like valve seat 45, in which a rounded shoulder 46 of the valve cone 35 is seated when the valve is in its closing position.

The valve seat 45 is penetrated by a valve tappet 47 inserted into the valve cone 35. This valve tappet 47 widens in a work chamber 48 to form a second valve seat 49, which is capable of receiving a valve head 50 of a bushing 51. This bushing 51 is inserted axially in a head bore 52 of a piston rod 53, where it meets a support body 54 undergirded with shims 55. Toward the head bore 52, a seal 56 is also provided.

There is a difference, in the outset region toward the work chamber 48, between the outside diameter of the bushing 51 and the inside diameter of the head bore 52, such that an annular chamber 57 is formed, by way of which power brake fluid can flow out of the work chamber 48 and a suitable radial bore 58 into chambers 59 behind the rod 15 and sheath 14.

For returning the power brake fluid from the work chamber 48, the bushing 51 has an axial bore 60, which communicates via corresponding apertures 61 and 62 in the support body 54 and in the shims 55 with a longitudinal bore 63 in the piston rod 53. From this longitudinal bore 63, a transverse bore 64 leads to an annular chamber 65, which is formed by the embodiment of different outside or inside diameters of the piston rod 53 or of a central bore 66 of an insert body 67 surrounding the piston rod 53. This insert body 67 closes the axial stepped bore 13 and is retained by a snap ring 68. The insert body 67 also forms the rear wall of the chamber 59 in which the power braking pressure is built up.

The annular chamber 65 is sealed off at one end by a lip seal 69 and at the other by a ring seal 70. The piston rod 53 is also connected via a corresponding connecting element 71 to a brake pedal, not shown in further detail.

From the annular chamber 65, a radial bore 72 leads to a longitudinal bore 73 penetrating the housing section 9; via corresponding bores 74 and 75, this longitudinal bore 73 communicates with a return chamber 76 for the power brake fluid for returning it to the supply container.

The low-friction seal 31 is followed in the rod 15 by a further annular chamber 77, and after that a by a sealing ring 78. From the annular chamber 77, a transverse bore 79 leads to a bottom chamber 80 of the stepped bore 34, which communicates with the axial bore 60 in the bushing 51, via axial bores 81, in the valve cone 35, and 82, in the valve tappet 47.

Between the low-friction seal 24 and the support body 25, there is also a collecting chamber 83, which communicates via bores 84, in the housing section 9, and 85, in the housing 1, with a longitudinal bore 86 in the housing 1 to the return line for returning brake fluid from the brake chambers.

A drainage bore 87, which (although not shown in detail) leads to the outside, is also located between the low-friction seal 22 and the low-friction seal 24 in the vicinity of the support ring 23. As a result, the space between the two seals 22 and 24 is relieved toward the atmosphere. The lip seal 27 is retained by a securing ring 92 and a disk 93. The O-rings 94–97 seal off the brake chamber and return chamber between the two housings.

OPERATION

The mode of operation of the brake system according to the invention is as follows:

A brake force acting upon a brake pedal is transmitted via the connecting element 71 to the piston rod 53. The piston rod 53 is displaced toward the left in the insert body 67, carrying the bushing 51 with it, causing tee valve head 50 to strike the valve seat 49. As a result, the return route for power brake fluid out of the work chamber 48 through the axial bore 60 and the following bores is blocked off.

As the process continues, the shoulder 46 lifts from the valve seat 45 and opens up the communication between the work chamber 48 and the bore 33, so that power brake fluid can enter the work chamber 48. The fluid flows through the annular chamber 57 and the radial bore 58 into the pressure chambers 59 behind the sheath 14 or rod 15, so that a power brake force is built up in these pressure chambers that displaces the rod 15 or sheath 14 toward the left, against the disk 6 and the compression spring 4, causing pressure to build up in the brake chamber 88. This brake pressure also acts upon the rod 3 for a second brake circuit and displaces it toward the left as well. The rod 3 can then, with its snap ring 7, engage a face-end bore 89 in the rod 15.

If the brake force at the pedal recedes, then the valve seat 50/49 opens, while the valve seat 45/46 closes. As a result, power brake fluid can flow out of the work chamber 48 through the axial bore 60, the aperatures 61 an 62, the longitudinal bore 63, the transverse bore 64, the annular chamber 65, the radial bore 72, the longitudinal bore 73 and the bores 74 and 75, to reach the return chamber 76. The disk 6 is guided to the right by the pressure of the compression spring 4 and takes the rod 15 along with it. Since a thrust collar 90 is provided between the rod 15 and the sheath 14, the rod 15 also carries the sheath 14 along, returning it to its outset position.

If the delivery system for power brake fluid fails, then the brake force acts via the piston rod 53 upon the rod 15, so that only this rod 15 generates a brake pressure. In that case, the sheath 14 remains in its outset position during displacement of the rod 15.

The seals 19 and 21, and 31 and 32, are embodied in a particularly low-friction fashion, so as not to hinder the sliding of the sheath 14 in the stepped bore 13 or of the rod 15 in the sheath 14. As a rule, however, low-friction seals permit slight leakage as the bodies move. In the present case, to prevent any leaking power brake fluid from reaching the brake chamber 88, a return route is provided after the seal 31, proceeding via the annular chamber 77, the transverse bore 79, the bottom chamber 80 and the axial bores 81 and 82 to the axial bore 60 in the bushing 51. Thus if power brake fluid should escape from the annular chamber 30 via the seal 31, it is returned over this course to the return line.

The situation is similar for the annular inlet chamber 16 between the sheath 14 and the housing section 9. If power brake fluid there flows via the seal 19, then it reaches the annular chamber 17, which communicates directly with the longitudinal bore 73 to the return chamber 76 via a bore 91.

The seals 78 and 21 serve above all to seal off the brake chamber 88. The brake fluid has no way here of possibly escaping into the power brake circuit. If brake fluid should nevertheless escape from the brake chamber 88 via the lip seal 27, then it reaches the collecting chamber 83, and from there flows via the bores 84 and 85 to the longitudinal bore 86. Through the bore 87, as already mentioned, the space between the two low-friction seals 22 and 24 is relieved.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A brake cylinder having at least one brake chamber and a brake booster actuatable by a piston rod, in which a pressure chamber (59) communicates via a brake valve assembly with both an inlet and an outlet for power brake fluid, said brake valve assembly (45/46), (49/50) is disposed in a stepped bore (34) of a rod (15), said rod is slidably supported in a sheath (14), said rod (15) has a diameter along its length which is slightly less than an inner diameter of said sheath (14), said sheath in turn slides in a housing section (9), wherein said sheath (14) and said rod (15) are disposed as a servo piston between said pressure chamber (59) for receiving power brake fluid and a pressure element (6) for a buildup of brake pressure in a brake chamber (88).

2. A brake cylinder as defined by claim 1, in which said rod (15) is guided in said sheath (14) via first and second low-friction seals (19, 21), and said sheath (14) is guided in said housing section (9) via third and fourth low-friction seals (31, 32).

3. A brake cylinder as defined by claim 2, in which said first and second low-friction seals (19, 21) enclose an inlet chamber (16) and said third and fourth low-friction seals (31, 32) enclose a first annular chamber (30).

4. A brake cylinder as defined by claim 1, in which said rod (15) has a thrust collar (90), which upon a return movement of said rod (15) carries said sheath (14) along with it.

5. A brake cylinder as defined by claim 1, in which said brake valve assembly includes a valve cone (35) which is seated in a valve bushing (36) and with said valve bushing (36) forms a seat valve (45/46) for the admission of the power brake fluid.

6. A brake cylinder as defined by claim 5, in which a valve tappet (47) is inserted into said valve cone (35), said valve tappet (47) penetrates said seat valve (45/46) and together with a valve head (50) of a bushing (51) embodies a second seat valve (49/50) for controlling the outflow of the power brake fluid.

7. A brake cylinder as defined by claim 6, in which said bushing (51) is seated in a piston rod (53) and with said piston rod forms a fourth annular chamber (57)

which connects between a fifth annular chamber (59) and a work chamber (48).

8. A brake cylinder as defined by claim 7, in which said return line includes an axial bore (60) in the bushing (51), a second longitudinal bore (63) in the piston rod (53), a transverse bore (64) and a sixth annular chamber (65) formed between said piston rod (53) and an insert body (67), and adjoins said sixth annular chamber (65) by suitable fifth bore (72), longitudinal bore (73) and sixth and seventh bores (74, 75) leading to a return chamber (76).

9. A brake cylinder as defined by claim 8, in which said third annular chamber (77) between said third low-friction seal (31) and said first ring (78) adjoins said axial bore (60) via a second transverse bore (79), a bottom chamber (80), and a second axial bore (81) in said valve cone (35) and a third axial bore (82) in said valve tappet (47).

10. A brake cylinder having at least one brake chamber and a brake booster actuatable by a piston rod, in which a pressure chamber (59) communicates via a brake valve assembly with both an inlet and an outlet for power brake fluid, said brake valve assembly (45/46), (49/50) is disposed in a stepped bore (34) of a rod (15), said rod is slidably supported and guided in a sheath (14) via first and second low friction seals (19, 21), said sheath in turn slides and is guided in a housing section (9) via third and fourth low-friction seals (31, 32), said first and second low-friction seals (19, 21) enclose an inlet chamber (16) and said third and fourth low-friction seals (31, 32) enclose a first annular chamber (30), and said first low-friction seal (19) is followed by a second annular chamber (17) which communicates via a bore (91) with a longitudinal bore (73) as part of a return line for the power brake fluid, wherein said sheath (14) and said rod (15) are disposed as a servo piston between said pressure chamber (59) for receiving power brake fluid and a pressure element (6) for a buildup of brake pressure in a brake chamber (88).

11. A brake cylinder as defined by claim 10, in which said third low-friction seal (31) is followed by a third annular chamber (77) which communicates with said return line for the power brake fluid.

12. A brake cylinder as defined by claim 11, in which said third annular chamber (77) is separated from said brake chamber (88) by a first sealing ring (78).

13. A brake cylinder as defined by claim 10, ion which said second annular chamber (17) is separated from said brake chamber (88) via a fifth low-friction seal (22).

14. A brake cylinder as defined by claim 13, in which a collecting chamber (83) is provided between said brake chamber (88) and said fifth low-friction seal (22), said collecting chamber (83) communicates via suitable second and third bores (84, 85) with said return line for the power brake fluid.

15. A brake cylinder as defined by claim 14, in which said collecting chamber (83) is sealed off on one side by a second sealing ring (24) and on the other side from the brake chamber (88) by a lip seal (27).

16. A brake cylinder as defined by claim 15, in which support bodies are provided between said second sealing ring (24) and said lip seal (27), and a space located between said second sealing ring (24) and said fifth low-friction seal (22) discharges from the master brake cylinder via a fourth bore (87).

17. A brake cylinder having at least one brake chamber and a brake booster actuatable by a piston rod, in which a pressure chamber (59) communicates via a brake valve assembly with both an inlet and an outlet for power brake fluid, said brake valve assembly (45/46), (49/50) is disposed in a stepped bore (34) of a rod (15), said rod is slidably supported and guided in a sheath (14) via first and second low friction seals (19, 21), said sheath in turn slides and is guided in a housing section (9) via third and fourth low-friction seals (31, 32),said first and second low-friction seals (19, 21) enclose an inlet chamber (16) and said third and fourth low-friction seals (31, 32) enclose a first annular chamber (30), and said third low-friction seal (31) is followed by a third annular chamber (77) which communicates with said return line for the power brake fluid, wherein said sheath (14) and said rod (15) are disposed as a servo piston between said pressure chamber (59) for receiving power brake fluid and pressure element (6) for a buildup of brake pressure in a brake chamber (88).

18. A brake cylinder as defined by claim 17, in which said third annular chamber (77) is separated from said brake chamber (88) by a first sealing ring (78).

19. A brake cylinder as defined by claim 18, in which said second annular chamber (17) is separated from said brake chamber (88) via a fifth low-friction seal (22).

20. A brake cylinder as defined by claim 17, in which said second annular chamber (17) is separated from said brake chamber (88) via a fifth low-friction seal (22).

* * * * *